US011820913B2

(12) United States Patent
Reuter et al.

(10) Patent No.: US 11,820,913 B2
(45) Date of Patent: Nov. 21, 2023

(54) USE OF RHAMNOLIPIDS AND/OR SOPHOROLIPIDS FOR INCREASING COVERAGE AND/OR FOR MAINTAINING APPLICATION PROPERTIES IN THE COURSE OF STORAGE OF COATING COMPOSITIONS

(71) Applicant: Evonik Operations GmbH, Essen (DE)

(72) Inventors: Ellen Reuter, Bochum (DE); Stefan Silber, Krefeld (DE); Petra Allef, Essen (DE); Katrin Roland, Essen (DE); Pedro Cavaleiro, Cologne (DE); Jochen Mergenthaler, Essen (DE); Claudia Jansen, Leverkusen (DE); Marco Blei, Essen (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/643,630

(22) Filed: Dec. 10, 2021

(65) Prior Publication Data

US 2022/0186075 A1    Jun. 16, 2022

(30) Foreign Application Priority Data

Dec. 15, 2020 (EP) .................................. 20214082

(51) Int. Cl.
| | | |
|---|---|---|
| *C09D 185/02* | (2006.01) | |
| *C09D 5/02* | (2006.01) | |
| *C08K 13/02* | (2006.01) | |
| *C08K 5/1545* | (2006.01) | |

(52) U.S. Cl.
CPC ........... *C09D 185/02* (2013.01); *C09D 5/027* (2013.01); *C09D 5/028* (2013.01); *C08K 5/1545* (2013.01); *C08K 13/02* (2013.01)

(58) Field of Classification Search
CPC ........................................................ C09D 5/00
See application file for complete search history.

(56) References Cited

U.S. PATENT DOCUMENTS

| | | | |
|---|---|---|---|
| 7,312,260 B2 | 12/2007 | Krappe et al. | |
| 8,957,129 B2 * | 2/2015 | Sadasivan ................ | C09D 5/14 523/122 |
| 10,301,486 B2 | 5/2019 | Göbelt et al. | |
| 2013/0296461 A1 * | 11/2013 | Sadasivan ............ | C09D 133/04 523/122 |
| 2021/0277257 A1 | 9/2021 | Roland et al. | |
| 2022/0041887 A1 | 2/2022 | Roland et al. | |
| 2022/0082484 A1 | 3/2022 | Isken et al. | |
| 2022/0082508 A1 | 3/2022 | Isken et al. | |
| 2022/0084181 A1 | 3/2022 | Isken et al. | |
| 2022/0186048 A1 | 6/2022 | Reuter et al. | |

FOREIGN PATENT DOCUMENTS

| | | | |
|---|---|---|---|
| DE | 197 43 841 | 4/1999 | |
| EP | 1 486 524 | 12/2004 | |
| EP | 1 745 104 | 12/2005 | |
| EP | 1 889 623 | 2/2008 | |
| EP | 2 847 285 | 2/2014 | |
| EP | 3 006 505 | 4/2016 | |
| EP | 3 385 338 | 10/2018 | |
| WO | 01/10447 | 2/2001 | |
| WO | 2005/113677 | 12/2005 | |
| WO | 2014/027249 | 2/2014 | |
| WO | 2016/059066 | 4/2016 | |
| WO | WO-2021189049 A1 * | 9/2021 | ............... C05D 9/02 |

OTHER PUBLICATIONS

Ciesielska (Characterization of a novel enzyme—Starmerella bombicola lactone esterase (SBLE)—responsible for sophorolipid lactonization, Appl Microbiol Biotechnol., 2016, 100:9529-9541).*
Glidden (Gripper Interior/Exterior Primer Sealer, Glidden Professional, Feb. 2010, 2 pages).*
Extended European Search Report dated Jun. 18, 2021, in European Patent Application No. 20214082.8, 5 pages.
Extended European Search Report dated May 16, 2022, in European Patent Application No. 21213075.1, 5 pages.
U.S. Appl. No. 17/190,919, filed Mar. 3, 2021, 2021/0277257, Roland et al.
U.S. Appl. No. 17/395,616, filed Aug. 6, 2021, 2022/0041887, Roland et al.
U.S. Appl. No. 17/476,785, filed Sep. 16, 2021, 2022/0082484, Isken et al.
U.S. Appl. No. 17/477,025, filed Sep. 16, 2021, 2022/0084181, Isken et al.
U.S. Appl. No. 17/547,575, filed Dec. 10, 2021, 2022/0186048, Reuter et al.
U.S. Appl. No. 17/476,983, filed Sep. 16, 2021, 2022/0082508, Isken et al.

* cited by examiner

*Primary Examiner* — Brieann R Johnston
(74) *Attorney, Agent, or Firm* — Grüneberg and Myers PLLC

(57) ABSTRACT

Rhamnolipids and/or sophorolipids can be used for increasing coverage and/or for maintaining application properties in the course of storage of coating compositions.

18 Claims, No Drawings

USE OF RHAMNOLIPIDS AND/OR SOPHOROLIPIDS FOR INCREASING COVERAGE AND/OR FOR MAINTAINING APPLICATION PROPERTIES IN THE COURSE OF STORAGE OF COATING COMPOSITIONS

CROSS-REFERENCE TO RELATED APPLICATIONS

This application claims priority to European Patent Application No. 20214082.8, filed on Dec. 15, 2020, the content of which is hereby incorporated by reference in its entirety.

BACKGROUND OF THE INVENTION

Field of the Invention

The invention relates to the use of rhamnolipids and/or sophorolipids for increasing coverage and/or for maintaining application properties in the course of storage of coating compositions.

Description of Related Art

Formulations used for many coating tasks contain particles such as colouring pigments or fillers.

For paint users, theoretical coverage of coating compositions is an important application property. For objects provided with a coating, theoretical coverage indicates how many $m^2$ of surface area can be coated with one kilogram or litre of the coating composition. The calculation uses a layer thickness with which a paint film having the desired hiding power can be achieved under standard conditions. Theoretical coverage is a calculated limiting value approximating to the value achievable. In practice. In the case of practical coverage, additional factors such as losses of material have to be taken into account, these being different according to the painting method, for example spraying or rolling, and substrate, for example rough, smooth or absorptive.

Coverage indicates the amount of paint required for an area to be coated in a hiding manner. Therefore, coverage is an important piece of information not just against the background of technical aspects, such as maximum quality of hiding of the substrates, but also from an economic point of view. The theoretical coverage ascertained enables a comparability of the material required for an area to be coated and the associated coating costs for the user.

For ascertainment of coverage, reference is made here to the "Richtlinie zur Bestimmung des Deckvermögens [Guideline for Determining Hiding Capacity], July 2002 edition. Verband der deutschen Lackindustrie e.V. [German Paints Industry Association]".

Accordingly, the hiding capacity of a coating is one of the crucial quality criteria, the oasis of which is the contrast ratio of a coating applied to a test substrate according to the guideline and test specification Four classes are specified for the contrast ratio in DiN EN 13300:
Class 1: ≥99.5%
Class 2. ≥98% and <99.5%
Class 3: ≥95% and <98%
Class 4: <95%

The classes are reported together with the coverage in $m^2/l$ at intervals of 0.5 Example: Class 1 at 8 $m^2/l$, or class 2 at 9.5 $m^2/l$.

It is known that factors contributing to good hiding capacity are firstly the solids content (determined inter alia by the proportion of pigments and fillers and binders in the formulation) and the density of the coating composition. This is significant since less of a paint having a high solids content has to be applied than in the case of a paint having a lower solids content in order to achieve a desired layer thickness of the dried paint film.

In order to incorporate pigments and fillers into liquid media and to establish the necessary size distribution of the particles, high mechanical forces are needed. However, pigments and fillers tend to reagglomerate or flocculate after the dispersion process, which negates the dispersion outcome and leads to serious performance problems, for example lack of colour intensity, lack of hiding capacity & contrast ratio; loss of gloss, changing viscosity in the course of storage, or settling problems in the wet paint.

Wetting and dispersing additives are generally used for reliable dispersion and stabilization of pigments in coating systems. Wetting and dispersing additives wet and cover, as interfacial substances, the surface of the particles to be dispersed, bring about a reduction in the viscosity of the mixtures to be dispersed, and stabilize these against unwanted particle reagglomeration or flocculation.

The prior art discloses, for example, polymeric wetting agents and dispersants which firstly contain groups having pigment affinity, such as carboxyl, amino or phenyl functionalities, and secondly contain side chains soluble in the medium. The groups having pigment affinity are ideally to have a rapid orientation to the surface of pigments and a high permanence thereon. Side chains ensure the compatibility with the dispersion medium or paint medium and steric stabilization of the dispersed phase.

EP 1 486 524 A1 describes the preparation of epoxy-amine adducts and salts thereof and their use as dispersants. These are obtainable by the reaction of mono- or polyfunctional aromatic epoxides with poiyoxyalkylenemonoarmnes.

EP 1 745 104 A1 discloses comb-type polyetheralkanolamines as dispersants for inks and printing inks.

WO 2016/059066 describes comb copolymers based on epoxy-amine adducts.

Likewise important for the achievement of the desired application properties are the rheological characteristics of the coating composition Therefore, the establishment of a rheology profile of the coating composition is particularly important. This rheology profile is defined by the application method to be employed (e.g. spraying, rolling, low coating, painting or printing methods), and is ensured by the choice of formulation.

In general, the rheology profile is measured over a wide shear rate range, it is known that a high shear rate is reflective, for example, of the tendency to spray or brush resistance, and formation of spray mist, and a low shear rate is reflective, for example, of running characteristics and paint finish.

However, the rheology profile established beforehand frequently changes during storage, such that the coating composition is no longer suitable for a particular application method.

Some publications also mention biosurfactants as dispersant, as defoamer, as wetting agent or as emulsifier in paints and coating materials. Known representatives of these biosurfactants are rhamnolipids and sophorolipids. These lipids are nowadays produced with wild-type isolates of various yeasts, especially with Candida bombicola.

EP 3 006 505 describes, for example, a coating composition comprising a dispersion consisting of a binder, a biocide and a biosurfactant consisting of rhamnolipids and sophorolipids. EP 2 847 285 discloses a similar composition, wherein the isothiazolinone biocide is specifically added. Both documents disclose the synergistic biocide action of the rhamnolipids and sophorolipids with a biocide.

SUMMARY OF THE INVENTION

It would be desirable to identify substances that increase the coverage of a coating composition without altering the filler level or nonvolatile content of the coating composition. It would also be desirable if the application properties of the coating composition are maintained as far as possible after storage.

Application and application method are to be used as synonyms.

It has now been found that, surprisingly, the use of rhamnolipids and/or sophorolipids for increasing the coverage of coating compositions is suitable, without altering the amount of pigments of fillers and other nonvolatile components. It has also been found that, completely surprisingly, the inventive use of rhamnolipids and/or sophorolipids causes the rheology profile after storage to have lower variance from the desired rheology profile established than that of a comparable commercial coating composition. Thus, usability of the coating composition according to the invention for the desired application is maintained.

The invention also includes the following embodiments:
1. Use of rhamnolipids and/or sophorolipids for increasing coverage and/or for maintaining application properties in the course of storage of coating compositions.
2. Use according to embodiment 1, characterized in that the coating compositions are paints and coating materials selected from interior wall paints, exterior paints, architectural paints, floor coatings, wood paints, industrial paints, automotive OEM or refinishing paints, primers, primer-surfacers, basecoats and topcoats.
3. Use according to either of the preceding embodiments, characterized in that the coating composition includes solids selected from fillers, pigments, dyes, optical brighteners, ceramic materials, magnetic materials.
4. Use according to any of the preceding embodiments, characterized in that the coating composition comprises further additives, preferably wetting agents, dispersing additives, rheology additives, levelling aids or defoamers.
5. Use according to any of the preceding embodiments, characterized in that the rhamnolipids are compounds of the general formula (I) or a salt thereof

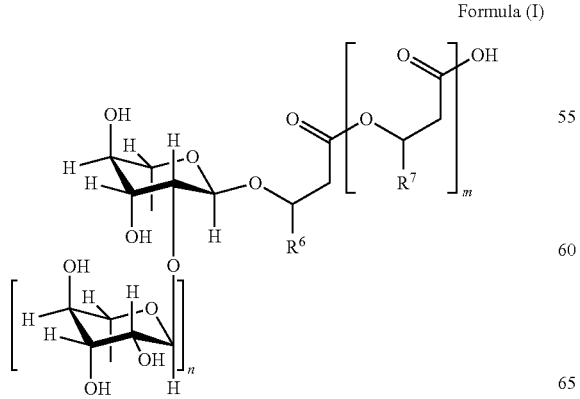

Formula (I)

where
m=2, 1 or 0, especially 1 or 0,
n=1 or 0, especially 1,
$R^6$ and $R^7$=independently an identical or different organic radical having 2 to 24, preferably 5 to 13, carbon atoms, especially optionally branched, optionally substituted, especially hydroxy-substituted, optionally unsaturated, especially optionally mono-, di- or triunsaturated, alkyl radical, preferably those selected from the group consisting of pentenyl, heptenyl, nonenyl, undecenyl and tridecenyl and $(CH_2)_x$—$CH_3$ with x=1 to 23, preferably 4 to 12.
6. Use according to any of the preceding embodiments, characterized in that the rhamnolipids are a mixed composition with >90% diRL.
7. Use according to any of the preceding embodiments, characterized in that the rhamnolipids are a mixed composition comprising rhamnolipids, characterized in that the mixed composition contains
51% by weight to 95% by weight of diRL-C10C10 and
0.5% by weight to 9% by weight of monoRL-C10C10.
where the percentages by weight are based on the sum total of all rhamnolipids present, with the proviso that the weight ratio of di-rhamnolipids to mono-rhamnolipids is greater than 91:9, preferably greater than 97:3, more preferably greater than 98:2.
8. Use according to any of the preceding embodiments, characterized in that the rhamnolipids are a mixed composition comprising rhamnolipids, characterized in that the mixed composition contains 0.5% by weight to 15% by weight of diRL-C10C12:1, where the percentages by weight are based on the sum total of all rhamnolipids present
9. Use according to any of the preceding embodiments, characterized in that the sophorolipids are compounds of the formula (II) or (IIa)

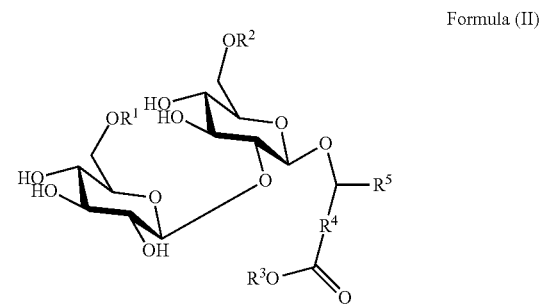

Formula (II)

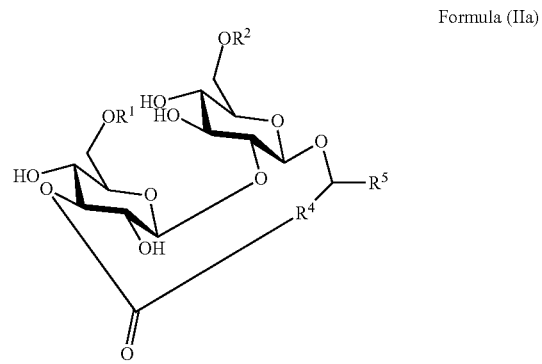

Formula (IIa)

where
- $R^1$ and $R^2$ are independently either H or an acetyl group,
- $R^3$ is H, a methyl, ethyl or hexyl group.
- $R^4$ is independently a saturated or unsaturated divalent branched or unbranched organic group.
- $R^5$ is H or a methyl group.
- with the proviso that the total number of the carbon atoms in the groups $R^4$ and $R^5$ do not exceed the number 29.

10. Use according to any of the preceding embodiments, characterized in that rhamnolipids and/or sophorolipids are used within a range from 0.01% by weight to 10.0% by weight, more preferably 0.1% by weight to 5.0% by weight, based on the overall coating composition.

DETAILED DESCRIPTION OF THE INVENTION

This variance of the rheology profile is quantified by measurement of the viscosity of a coating composition at particular shear rates before and after storage. In the paints industry, viscosity values before (for example one day after production of the coating composition) and after storage (for example one week after production of the coating composition) at the shear rates of 1/sec, 100/sec and 1000/sec are typically employed in order to make a statement as to the application properties of the coating composition. The greater the numerical value of the viscosity ratio established, the greater the variance from the desired rheology profile established as well.

The coating compositions are preferably preparations for various fields of application that are applied to the substrate to be coated by application methods such as, for example, spraying, dipping, rolling, pouring or painting application, and various printing methods.

Examples of coating materials in the context of the present invention are paints, coating materials, printing inks and other coating materials, such as solventborne or aqueous coatings and solvent-free coatings, powder coatings. UV-curable coatings, low-solids, medium-solids and high-solids, automotive coatings, wood coatings, baked coatings, 2-component coatings, metal coating materials, toner compositions. Further examples of coating materials are given in "Bodo Müller. Ulrich Poth, Lackformuiierung und Lackrezeptur. Lehrbuch für Ausbildung und Praxis [Coating Formulation and Coating Composition. Textbook for Training and Practice], Vincentz Verlag. Hanover (2003), 73-1996" and "P G. Garrat, Strählenhartung [Radiative Curing], Vincent Verlag, Hanover (1996)".

Coating materials and coating compositions are used as synonyms.

The paints and coating materials are interior wall paints, exterior paints, architectural paints, floor coatings, wood paints, industrial paints, paints for automotive OEM (original equipment manufacturer) or refinishing, primers, primer-services, basecoats and topcoats.

Examples of printing inks and/or printing varnishes in the context of the present invention are solvent-based or aqueous printing inks, flexographic printing inks, intaglio printing inks, letterpress or relief printing inks, offset printing inks, lithographic printing inks, printing inks for printing of packaging, screenprinting inks, printing inks such as printing inks for inkjet printers, inkjet ink, printing varnishes such as overprint varnishes. Further printing ink and/or printing varnish formulations are given in "E. W. Flick, Printing Ink and Overprint Varnish Formulations—Recent Developments. Noyes Publications, Park Ridge NJ, (1990)" and subsequent editions.

The coating compositions preferably include solids selected from the group of the fillers, pigments, dyes, optical brighteners, ceramic materials, magnetic materials.

Examples of pigments are those from the group of inorganic pigments, such as carbon blacks, titanium dioxides, zinc oxides, Prussian blue, iron oxides, cadmium sulfides, chromium pigments, for example chromates, molybdates and mixed chromates and sulfates of lead, zinc, barium, calcium and mixtures thereof. Further examples of inorganic pigments are specified in the book "H. Endriss, Aktuelle anorganische Bunt-Pigmente [Inorganic Colour Pigments Today], Vincentz Veriag, Hannover (1997)".

Examples of organic pigments are those from the group of the azo, diazo, condensed azo, naphthol, metal complex, thioindigo, indanthrone, isoindanthrone, anthanthrone, anthraquinone, isodibenzanthrone, triphendioxazine, quinacridone, perylene, diketopyrrolopyrrole and phthalocyanine pigments. Further examples of organic pigments are specified in the book "W. Herbst. K. Hunger, Industrial Organic Pigments. VCH, Weinheim (1993)".

Examples of fillers are those from the groups of talc, kaolin, silicas, barytes and lime; ceramic materials, for example aluminium oxides, silicates, zirconium oxides, titanium oxides, boron nitrides, silicon nitrides, boron carbides, mixed silicon aluminium nitrides and metal titanates; magnetic materials, for example magnetic oxides of transition metals, such as iron oxides, cobalt-doped iron oxides and ferrites; metals, for example iron, nickel, cobalt and alloys thereof.

The person skilled in the art will be aware that such coating compositions may include further ingredients. As liquid medium, they may contain organic solvents (e.g. acetates such as methyl or ethyl acetate, hydrocarbons such as petroleum spirits of various boiling ranges, alcohols, ethers, glycols and glycol ethers) and/or water, as known as prior art depending on the binders used.

It is possible to use customary binders. It is possible with preference to use alkyd, acrylate, styrene-acrylate, epoxy, polyvinylacetate, polyester or polyurethane binders. Any kind of curing is possible, for example by oxidative drying, physical drying, self-crosslinking, UV or electron beam curing or crosslinking by baking.

It is conceivable that the coating composition comprises further additives, for example preferably wetting agents, dispersing additives, rheology additives, levelling aids or defoamers.

Rhamnolipids and sophorolipids are surfactants which can be prepared by means of fermentation.

Rhamnolipids are composed of one to two rhamnose units and one to three, mostly β-hydroxy fatty acids. The fatty acids can be saturated or unsaturated.

The variation in the chain length and number (congener) of the fatty acid portions has been described in a number of publications (Howe et al., FEBS J. 2006; 273(22):5101-12; Abdel-Mawgoud et al., Appl Microbiol Biotechnol. 86, 2010; p. 1323-1336).

Miao et al., Journal of Surfactants and Detergents, 17 (6), 2014; 1069-1080, describes the synthesis of di-rhamnolipid ethyl esters by esterification with ethanol and also the suitability of the esters as nonionic surfactant.

WO 2001 010447 and EP1 889 623 disclose the pharmaceutical and cosmetic applications of rhamnolipids and short-chain rhamnolipid esters (C1-C6; methyl to hexyl esters, linear or branched), in particular in wound healing.

The rhamnolipids are preferably compounds of the general formula (I) or salts thereof

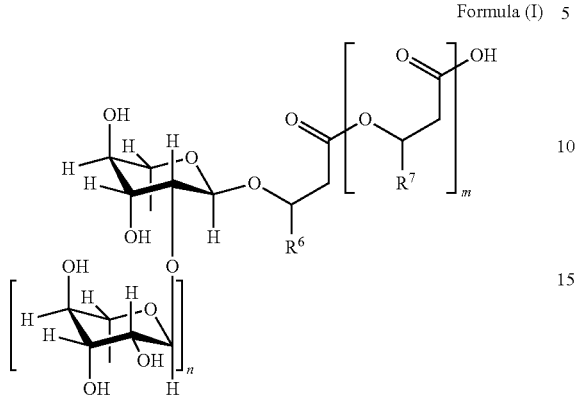

Formula (I)

where
m=2.1 or 0, especially 1 or 0,
n=1 or 0, especially 1,
$R^6$ and $R^7$=independently an identical or different organic radical having 2 to 24, preferably 5 to 13, carbon atoms, especially optionally branched, optionally substituted, especially hydroxy-substituted, optionally unsaturated, especially optionally mono-, di- or triunsaturated, alkyl radical, preferably those selected from the group consisting of pentenyl, heptenyl, nonenyl, undecenyl and tridecenyl and $(CH2)_x$—CH3 with x=1 to 23, preferably 4 to 12.

Preference is given to a mixed composition of rhamnolipids containing >90% diRL.

Preference is given to a mixed composition of rhamnolipids containing
51% by weight to 95% by weight of diRL-C10C10 and
0.5% by weight to 9% by weight of monoRL-C10C10,
where the percentages by weight are based on the sum total of all rhamnolipids present, with the proviso that the weight ratio of di-rhamnolipids to mono-rhamnolipids is greater than 91:9, preferably greater than 97:3, more preferably greater than 98:2.

For the use according to the invention, preference is given to using a rhamnolipid mixture containing 0.5% by weight to 15% by weight of diRL-C10C12:1, where the percentages by weight are based on the sum total of all rhamnolipids present.

The sophorolipids are preferably compounds of the formula (II) or (IIa)

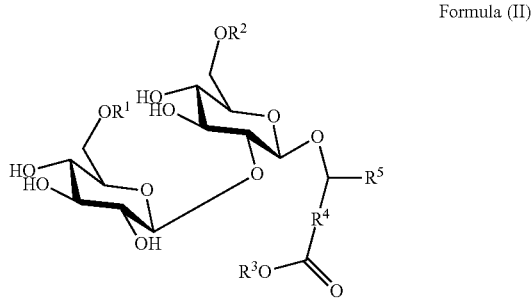

Formula (II)

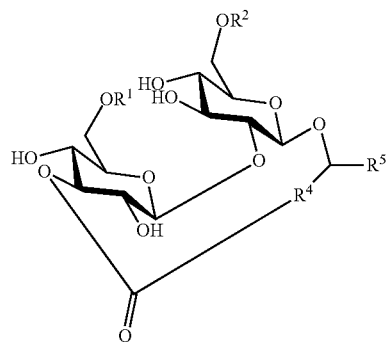

Formula (IIa)

where
$R^1$ and $R^2$ are independently either H or an acetyl group,
$R^3$ is H, a methyl, ethyl or hexyl group.
$R^4$ is independently a saturated or unsaturated divalent branched or unbranched organic group,
$R^5$ is H or a methyl group.
with the proviso that the total number of the carbon atoms in the groups $R^4$ and $R^5$ do not exceed the number 29.

Rhamnolipids are available under the Natsurfact name from Stepan (Northfield, IL, USA) and RHEANCE® One from Evonik Operations GmbH.

Sophorolipids are available under the HoneySurf name from Holiferm Limited (Manchester. UK) and REWOFERM® SL ONE from Evonik Operations GmbH.

Preference is given to using rhamnolipids and/or sophorolipids within a range from 0.01% by weight to 10.0% by weight, more preferably 0.1% by weight to 5.0% by weight, based on the overall coating composition.

Preference is given to using the rhamnolipids and sophorolipids of the general formulae (I), (II) and (IIa) for increasing the storage stability of coating compositions.

Preference is given to using the rhamnolipids and sophorolipids of the general formulae (I), (II) and (IIa) for reducing the amount of coating compositions used.

The invention is to be elucidated in detail hereinafter by working examples.

Methods

Determination of Rheology Profile and Viscosity Ratio

The rheology profile of the coating compositions is determined with the aid of a rotary viscometer (Euro Physics. Rheo 2000 RC20). The measurement system used was a plate/cone system (45 mm, angle 1°, measurement temperature 25'C). The following shear rates and residence times were chosen:
0.1 to 10 $s^{-1}$ in 60 s
10 to 90 $s^{-1}$ in 30 s
100 to 1000 $s^{-1}$ in 40 s
1000 to 10 000 $s^{-1}$ in 40 s Variance was assessed using the viscosity values of the coating compositions shown in the rheology profile before and after storage at shear rates of 1, 100 and 1000 $s^{-1}$. The viscosity ratio in % can be calculated as follows:

Viscosity ratio in %=(viscosity, 1 week after production at 50° C./viscosity one day after production)*100

The greater the numerical value of the viscosity ratio, the greater the variance of the rheology profile after storage from the desired rheology profile established.

Coverage

The coverage of a coating composition is defined in the "Richtlinie zur Bestimmung des Deckvermögens". VdL-RL 09 from the Verfcand der deutschen Lackindustrie e. V., July 2002 edition.

A substrate with a standardized surface having black and white fields (Form 2A from Leneta) was weighed. The paint was applied to the substrates with the aid of a film applicator in wet film thicknesses of 150, 200 and 240 µm. The freshly coated substrates were weighed again and then dried at 23° C. and 50% air humidity for 24 hours. Thereafter, the contrast ratio of ail drawdowns was measured with a Byk Gardner spectrophotometer with a gloss trap. For this purpose, measurement was effected at five measurement points, in each case in three black fields (Ys values) and in each case in three white fields (Yw values).

The contrast ratio was ascertained by forming the quotient Ys/Yw * 100 [%] of the average values Yw and Ys. Coverage was then ascertained in $m^2/l$ at 99.5% contrast ratio, taking account of the specific density of the paint and the amount of paint applied in each case.

EXAMPLES

1. Production of a Coating Composition

For the performance assessment, coating compositions CE1. E2 and E3 were produced according to the figures from Table 1. Comparative example CE1 was produced with the commercial dispersant Tego Dispers 747 W.

First of all, positions 1 to 5 were initially charged and homogenized with a Dispermat (Dispermat CA from VMA-Getzmann GmbH) at 800 rpm for five minutes, then position 6 was added while stirring at 800 rpm and the mixture was stirred for 2 minutes. Positions 7 to 11 were then added at 2500 rpm and the mixture was stirred for 30 minutes. Subsequently, the formulation was cooled down by stirring at 500 rpm for 15 minutes. Positions 12 to 14 were added while stirring at 2500 rpm.

2. Technical Testing

For performance testing, coating compositions CE1, E2 and E3 from Example 1 were examined with regard to Theological characteristics before and after storage, and coverage was determined.

2.1 Coverage

Table 2 shows the coverage results. It is found that the coating compositions, by virtue of the inventive use of Rewoferm® SL ONE or RHEANCE° One, achieved higher coverage at a contrast ratio of 99.5% (class 1) than with conventional TEGO® Dispers 747 W.

TABLE 2

| Coating compositions | Coverage in ($m^2/l$) at contrast ratio 99.5% |
| --- | --- |
| CE1 | 3.67 |
| E2 | 5.25 |
| E3 | 4.17 |

2.2 Viscosity Ratio

Table 3 shows the measured viscosities of the respective coating composition before and after storage, and their viscosity ratios.

It is found that the coating compositions, by virtue of the inventive use of Rewoferm® SL ONE or RHEANCE® One, have a lower viscosity ratio at the shear rates (1/sec, 100/sec, 1000/sec) than with conventional TEGO® Dispers 747 W. It is thus possible to draw the conclusion that the coating compositions according to the invention better retain application properties in the course of storage than the comparative examples.

TABLE 1

| | Product | CE1 Amount in g | E2 Amount in g | E3 Amount in g | Manufacturer | Description |
| --- | --- | --- | --- | --- | --- | --- |
| 1 | Deionized water | 20.7 | 20.7 | 20.7 | Evonik Operations GmbH | |
| 2 | Calgon N | 0.1 | 0.1 | 0.1 | BK Giulini | Polyphosphate |
| 3 | Additive 1: Tego Dispers 747 | 0.2 | | | Evonik Operations GmbH | Copolymer |
| | Additive 2: Rewoferm SL One | | 0.2 | | Evonik Operations GmbH | Sophorolipid |
| | Additive 3: RHEANCE ® One | | | 0.2 | Evonik Operations GmbH | Rhamnolipid |
| 4 | Acticid MBS | 0.2 | 0.2 | 0.2 | Thor GmbH | Biocide |
| 5 | Tylose H 30.000 YP 2 | 0.4 | 0.4 | 0.4 | SE Tylose GmbH & Co. KG | Rheology additive |
| 6 | Aqueous ammonium hydroxide solution (25%) | 0.1 | 0.1 | 0.1 | AUG. HEDINGER GmbH & Co. KG | Adjustment to pH of 6.5-9.0 |
| 7 | Tioxide R-TC 90 | 12 | 12 | 12 | Huntsman Corporation | Pigment |
| 8 | Omyacarb Extra CL | 5 | 5 | 5 | Omya GmbH | Filler |
| 9 | Talkum OOC | 5 | 5 | 5 | Imerys Performance Additives | Filler |
| 10 | Omyacarb 2 GU | 10 | 10 | 10 | Omya GmbH | Filler |
| 11 | Omyacarb 10 GU | 14 | 14 | 14 | Omya GmbH | Filler |
| 12 | Tego Foamex 26 | 0.3 | 0.3 | 0.3 | Evonik Operations GmbH | Defoamer |
| 13 | Mowilith 1871 | 30 | 30 | 30 | Celanese Corporation | Binder |
| 14 | Texanol | 2 | 2 | 2 | Eastman Corporation | Film-forming aid |

TABLE 3

| Examples | Shear rate (1/sec) | Viscosity in mPas 1 day after production | Viscosity in mPas 1 week after production at 50° C. | Viscosity ratio in % |
|---|---|---|---|---|
| CE1 | 1 | 75700 | 207000 | 274% |
|  | 100 | 2010 | 5230 | 260% |
|  | 1000 | 449 | 414 | 92% |
| E2 | 1 | 67000 | 97000 | 145% |
|  | 100 | 1990 | 2570 | 129% |
|  | 1000 | 501 | 466 | 93% |
| E3 | 1 | 70500 | 85800 | 122% |
|  | 100 | 2070 | 2310 | 112% |
|  | 1000 | 484 | 432 | 89% |

The invention claimed is:

1. A method of increasing coverage of a coating composition, the method comprising:
mixing at least one rhamnolipid (RL) into a coating composition,
wherein the at least one rhamnolipid (RL) comprises a mixed composition of di-rhamnolipids (diRL) and mono-rhamnolipids (monoRL),
wherein the at least one rhamnolipid is a mixed composition with >90% diRL, and
wherein the coverage is increased compared to a coating composition without the at least one rhamnolipid (RL).

2. The method according to claim 1, wherein the coating composition is a paint or coating material selected from the group consisting of an interior wall paint, an exterior paint, an architectural paint, a floor coating, a wood paint, an industrial paint, an automotive OEM or refinishing paint, a primer, a primer-surfacer, a basecoat, and a topcoat.

3. The method according to claim 1, wherein the coating composition includes at least one solid selected from the group consisting of a filler, a pigment, a dye, an optical brightener, a ceramic material, and a magnetic material.

4. The method according to claim 1, wherein the coating composition comprises at least one further additive.

5. The method according to claim 1, wherein the at least one rhamnolipid comprises a compound of the formula (I) or a salt thereof:

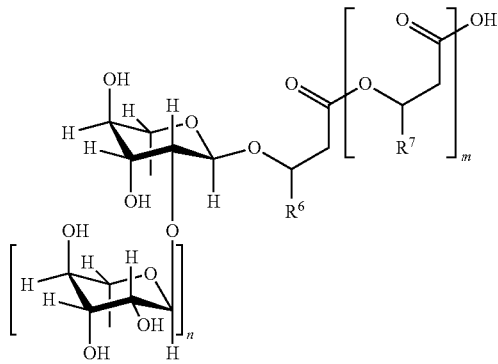

Formula (I)

wherein
m=2, 1, or 0,
n=1 or 0, and
$R^6$ and $R^7$=independently an identical or different organic radical having 2 to 24 carbon atoms.

6. The method according to claim 1, wherein the at least one rhamnolipid is a mixed composition comprising rhamnolipids, wherein the mixed composition contains:
51% by weight to 95% by weight of diRL-C10C10, and
0.5% by weight to 9% by weight of monoRL-C10C10,
wherein percentages by weight are based on a sum total of all rhamnolipids present, and with the proviso that a weight ratio of di-rhamnolipids to mono-rhamnolipids is greater than 91:9.

7. The method according to claim 1, wherein the at least one rhamnolipid is a mixed composition comprising rhamnolipids, wherein the mixed composition contains 0.5% by weight to 15% by weight of diRL-C10C12:1, wherein percentages by weight are based on a sum total of all rhamnolipids present.

8. The method according to claim 1, wherein the at least one rhamnolipid is present within a range from 0.01% by weight to 10.0% by weight, based on the coating composition.

9. The method according to claim 4, wherein the at least one further additive is selected from the group consisting of a wetting agent, a dispersing additive, a rheology additive, a levelling aid, and a defoamer.

10. The method according to claim 5, wherein in the Formula (I), $R^6$ and $R^7$ are independently an optionally branched, optionally substituted, optionally unsaturated alkyl radical having 2 to 24 carbon atoms.

11. The method according to claim 5, wherein in the Formula (I), $R^6$ and $R^7$ are independently selected from the group consisting of pentenyl, heptenyl, nonenyl, undecenyl, tridecenyl, and $(CH_2)_x$—$CH_3$ with x=1 to 23.

12. The method according to claim 6, wherein the weight ratio of di-rhamnolipids to mono-rhamnolipids is greater than 98:2.

13. The method according to claim 8, wherein the at least one rhamnolipid is present within a range from 0.1% by weight to 5.0% by weight, based on the coating composition.

14. A method of increasing coverage of a coating composition, the method comprising mixing at least one rhamnolipid (RL) into a coating composition, wherein the at least one rhamnolipid is a mixed composition with >90% di-rhamnolipids (diRL), wherein the coverage is increased and, optionally, application properties are maintained, compared to a coating composition without the at least one rhamnolipid (RL), and wherein the at least one rhamnolipid is present within a range from 0.1% by weight to 5.0% by weight, based on the coating composition.

15. A coating composition formed by the method according to claim 1.

16. A coating composition formed by the method according to claim 14.

17. A method according to claim 1, wherein the application properties are maintained compared to a coating composition without the at least one rhamnolipid (RL).

18. The method according to claim 1, wherein at least one sophorolipid is additionally mixed into the coating composition.

* * * * *